United States Patent [19]

Kondo

[11] Patent Number: 5,739,873
[45] Date of Patent: *Apr. 14, 1998

[54] METHOD AND APPARATUS FOR PROCESSING COMPONENTS OF A DIGITAL SIGNAL IN THE TEMPORAL AND FREQUENCY REGIONS

[75] Inventor: Tetsujiro Kondo, Kanagawa, Japan

[73] Assignee: Sony Corporation, Tokyo, Japan

[*] Notice: The term of this patent shall not extend beyond the expiration date of Pat. No. 5,555,465.

[21] Appl. No.: 612,055

[22] Filed: Mar. 7, 1996

Related U.S. Application Data

[63] Continuation of Ser. No. 451,057, May 25, 1995, Pat. No. 5,555,465.

[30] Foreign Application Priority Data

May 28, 1994 [JP] Japan ................................. 6-138054
May 28, 1994 [JP] Japan ................................. 6-138055

[51] Int. Cl.$^6$ ............................... H04N 9/64; H04N 7/01
[52] U.S. Cl. ................................. 348/720; 348/448
[58] Field of Search .................... 348/571, 575, 348/720, 721, 398, 397, 437, 438, 625, 448, 458, 450, 441

[56] References Cited

U.S. PATENT DOCUMENTS 5,384,868 1/1995 Maeda et al. ........................ 348/420

Primary Examiner—Victor R. Kostak
Attorney, Agent, or Firm—Frommer Lawrence & Haug LLP; William S. Frommer

[57] ABSTRACT

As processing a digital information signal (a digital video signal etc), the improvement in the accuracy of the signal process can be made by integrating the time region process and the frequency region process. An input digital video signal is supplied to a DCT circuit 3. The DCT circuit 3 converts the input video digital signal into coefficient data. A categorizing circuit 5 separates a flat component 6a and an impulse component 6b in a frequency region from the input signal. The flat component 6a is supplied to an inverse DCT circuit 7. The inverse DCT circuit 7 converts the input signal into a signal on a time axis. A class categorizing adaptive processing circuit 9 compensates a resolution in a time region. The impulse component 6a is supplied to a gain converting circuit 10. The gain converting circuit 10 compensates the high band in a frequency region. The output signal of the gain converting circuit 10 is supplied to an inverse DCT circuit 11. The inverse DCT circuit 11 converts the input signal into a signal on a time axis. A mix circuit 14 mixes signals that have been processed. Thus, a video signal compensated the resolution is obtained from an output terminal 15. The adaptive procession circuit 9 and the gain converting circuit 10 use pre-learnt predicted coefficients, predicted values, and gain converting ratio.

26 Claims, 10 Drawing Sheets

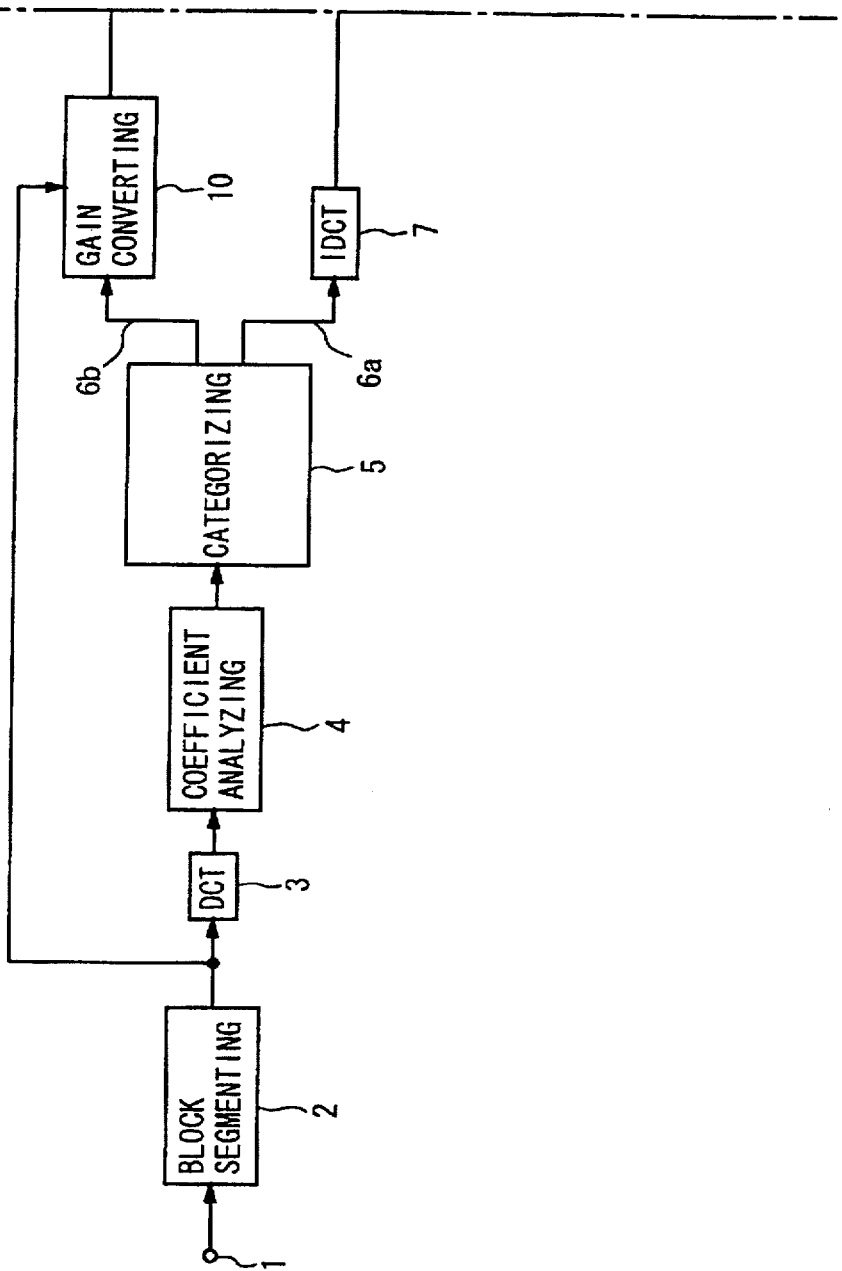

1

METHOD AND APPARATUS FOR PROCESSING COMPONENTS OF A DIGITAL SIGNAL IN THE TEMPORAL AND FREQUENCY REGIONS

This application is a continuation of application Ser. No. 08/451,057, filed May 25, 1995 now U.S. Pat. No. 5,555,465.

BACKGROUND OF THE INVENTION

1. Field of the Invention

The present invention relates to a signal processing apparatus and method for digital signals such as a digital image signal and a digital audio signal.

2. Description of the Related Art

Conventional signals such as digital image signal and digital audio signal are process in a time region or in a frequency region. In the process of the frequency region, the component with the steady characteristic (the steady component) can be properly represented, while the component with the transient characteristic (the transient component) cannot be properly represented. In contrast, in the process of the time region, the component with the transient characteristic can be properly represented, while the component with the steady characteristic cannot be properly represented. The steady characteristic represents a stable repetitive change. On the other hand, the transient characteristic represents an independent single change.

As an example, FIGS. 1A and 1B show the case of a process in the time region. As shown in FIG. 1A, the component having the transient characteristic represents a wave form that largely changes on the time axis (impulse wave form). After sampling the wave form, it can be satisfactorily processed with for example several samples. Dots in the wave form represent sampling points. In the case of a digital signal, the dots represent a discrete signal sequence with sampling values corresponding to the levels of sampling points. However, in the case shown in FIGS. 1A and 1B, the transient characteristic can be represented by an analog signal wave. This applies to the following description. On the other hand, the component with the steady characteristic represents a wave form that gradually varies (flat wave form) on the time axis as shown in FIG. 1B. In this case, the feature of the wave form cannot be obtained with several samples. Thus, the steady characteristic cannot be satisfactorily processed.

In the frequency region, since the component with the steady characteristic includes one kind of single component or a few kinds of frequency components, it is represented as an impulse wave form as shown in FIG. 2A. On the other hand, the component with the transient characteristic is represented as a flat wave form as shown in FIG. 2B. As with the case of the time region, the impulse wave form more suitably represents the feature of the signal than the flat wave form.

A general signal wave form includes the component with the steady characteristic (flat) portions FL1, FL2, FL3, . . . etc. and the component with the transient characteristic (impulse) portions IM1, IM2, . . . etc. on the time axis as shown in FIG. 3. Thus, when one of the time region process and the frequency region process is performed, the feature of the signal cannot be correctly obtained. Thus, for the same signal, the process in the time region and the process in the frequency region should be performed, thereby increasing the process time and/or hardware scale.

OBJECTS AND SUMMARY OF THE INVENTION

An object of the present invention is to provide a digital signal processing apparatus for processing the component with the steady characteristic portions of a digital signal in a frequency region and the component with the transient characteristic portions of the digital signal in a time region while decreasing the process time and hardware scale.

According to an aspect of the invention, there is provided a digital signal processing apparatus, comprising at least one analyzing means of first analyzing means for analyzing an input digital signal in a time region and second analyzing means for analyzing the input digital signal in a frequency region, a categorizing means for categorizing the input digital signal into two components corresponding to an analyzed output of the analyzing means, first and second processing means for adaptively processing the signals categorized by the categorizing means in the time region and in the frequency region, respectively, and a mixing means for mixing outputs of the first and second processing means.

An input digital signal (for example, a digital video signal) is transformed by DCT into coefficient data. The coefficient data is analyzed so as to separate an impulse component and a flat component in a frequency region from the coefficient data. In the frequency region, the impulse signal is processed by a first processing means. The flat component in the frequency region becomes an impulse signal in a time region. Thus, the impulse component in the frequency region is processed by a second processing means in the time region. Since the signal is processed in the impulse shape, the result of the process is improved.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1A:
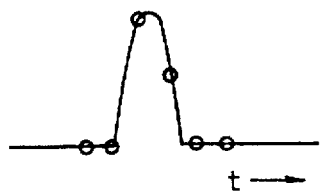
FIGS. 1A and 1B are schematic diagram showing an impulse component and a flat component in a time
Figure 1B:
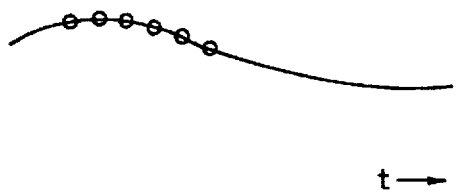
Figure 2A:
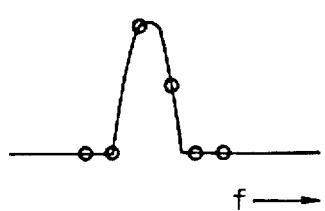
FIGS. 2A and 2B are schematic diagram showing an impulse component and a flat component in a frequency region.
Figure 2B:
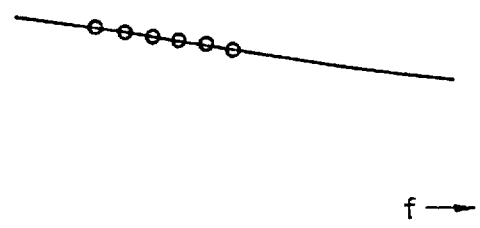
Figure 3:
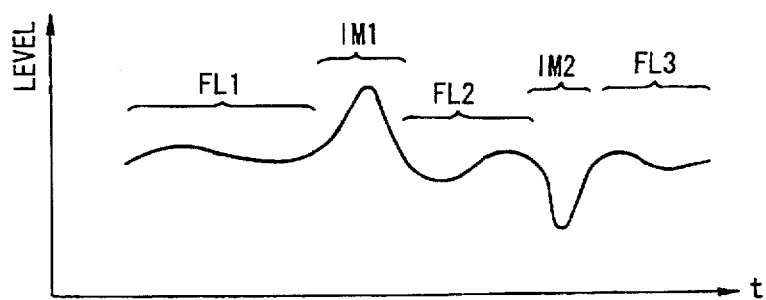
FIG. 3 is a schematic diagram showing a signal wave form including both an impulse component and a flat component in a time region.
Figure 4A:
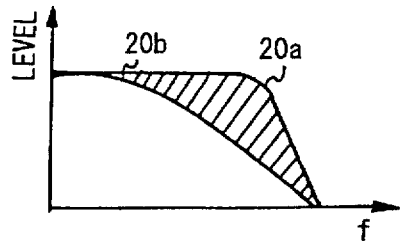
FIGS. 4A and 4B are schematic diagram for explaining the compensation of resolution according to an embodiment of the present invention.
Figure 4B:
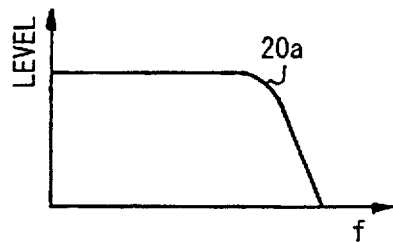

Next, with reference to the accompanying drawings, an embodiment of the present invention will be described. In this embodiment, the present invention is applied for the compensation of resolution of a digital video signal. As shown in FIG. 4A, when the resolution is compensated, a band (with frequency characteristic 20a) of a video signal that is narrowed by a filtering process or the like is compensated into a band (with frequency characteristic 20b). In other words, by generating a component represented by a hatched portion, a narrow band of the video signal is converted into a wide band of the video signal as shown in FIG. 4B.

Figure 5B:
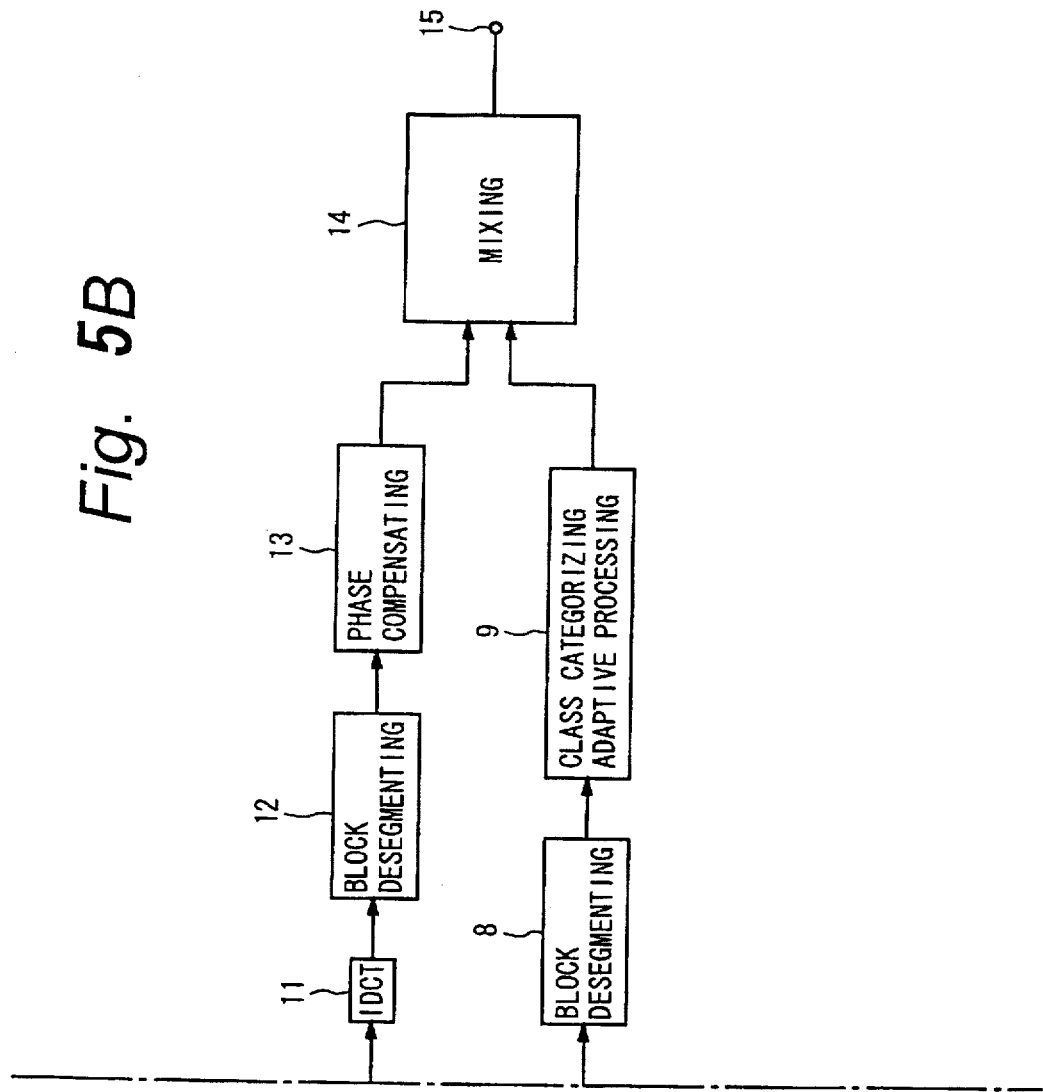
FIG. 5 is a overall block diagram of an embodiment of the present invention.

FIG. 5 shows the overall construction of the embodiment. In FIG. 5, a digital video signal with a standard resolution (referred to as an SD video signal) is supplied to an input terminal 1. A digital video signal with a high resolution is referred to as an HD video signal. Examples of the input SD video signal are an SDVCR (Standard Definition Video Cassette Recorder) reproduction signal, broadcasting signal, and so forth. The input SD video signal is supplied to a block segmenting circuit 2. The block segmenting circuit 2 scans and converts a video signal in TV raster sequence into a signal with a block structure of (8×8).

A DCT (Discrete Cosine Transform) circuit 3 is connected to the block segmenting circuit 2. The DCT circuit 3 generates coefficient data DC of one DC component and coefficient data AC1, AC2, . . . , AC63 of 63 AC components. As an example, the coefficient data are output in zigzag scanning method from DC coefficient data to higher order AC coefficient data. The DCT is one means for analyzing the frequency of the input video signal. Alternatively, FFT (Fast Fourier Transformation), Hadamard transformation, and so forth may be used.

The coefficient data that are output from the DCT circuit 3 are supplied to a categorizing circuit 5 through a coefficient analyzing circuit 4. The coefficient analyzing circuit 4 and the categorizing circuit 5 separate a steady component and a transient component from the digital video signal that has been converted into the frequency region. The categorizing circuit 5 outputs a flat component in the frequency region (namely, the transient component) in the time region 6a and an impulse component in the frequency region (namely, the steady component) 6b.

For easy understanding, it is assumed that values of coefficient data are DC=50, AC1=48, AC2=46, AC3=44, AC4=42, AC5=60, and so forth. The coefficient analyzing circuit 4 analyzes the coefficient data and determines that AC5 is an impulse component. In other words, due to the tendency of changes of AC1, AC2, AC3, and AC4, AC5 must be 40. However, since AC5 is actually 60, it deviates for 20. The categorizing circuit 5 separates flat components in the frequency region (transient component, in the time region in the example, DC=50, AC1=48, AC2=46, AC3=44, AC4=42, AC5=40, . . . ) 6a and pulse components in the frequency regions (steady components, in the example, DC=0, AC1=0, AC2=0, AC3=0, AC4=0, AC5=20, . . . ) 6b.

The flat component in the frequency region 6a that is output from the categorizing circuit 5 is supplied to an inverse DCT circuit 7. The inverse DCT circuit 7 restores a signal in the time region. The signal in the time region is supplied to a block desegmenting circuit 8. The block desegmenting circuit 8 outputs a digital video signal in the TV raster scanning sequence. The digital video signal is supplied to a class categorizing adaptive processing circuit 9 as a second processing circuit. As will be described later, the circuit 9 increases the resolution in the time region. The flat component in the frequency region 6a is suitable for the process in the time region. Thus, the circuit 9 properly compensates the resolution.

The impulse component in the frequency region 6b that is output from the categorizing circuit 5 is supplied to a gain converting circuit 10. The output signal of the block segmenting circuit 2 is supplied to the gain converting circuit 10 so as to categorize the output signal as a class. The gain converting circuit 10 has a memory that stores pre-learnt gain converting ratio information as will be described later. By adjusting the gain of the coefficient data corresponding to the converting ratio information, the high band component in the frequency region is increased. The output signal of the gain converting circuit 10 is supplied to an inverse DCT circuit 11. The inverse DCT circuit 11 restores a signal in the time region. The signal in the time region is supplied to a block desegmenting circuit 12. The block desegmenting circuit 12 converts the signal in the time region into data in the TV raster scanning sequence.

An output signal of the block desegmenting circuit 12 is supplied to a mixing circuit 14 through a phase compensating circuit 13. The mixing circuit 14 mixes the output signal of the block desegmenting circuit 12 and the output signal of the class categorizing adaptive processing circuit 9. The mixing circuit 14 simply mixes these signals. The mixing circuit 14 outputs a digital video signal whose resolution has been compensated (namely, an HD video signal) to an output terminal 15.

Figure 6:
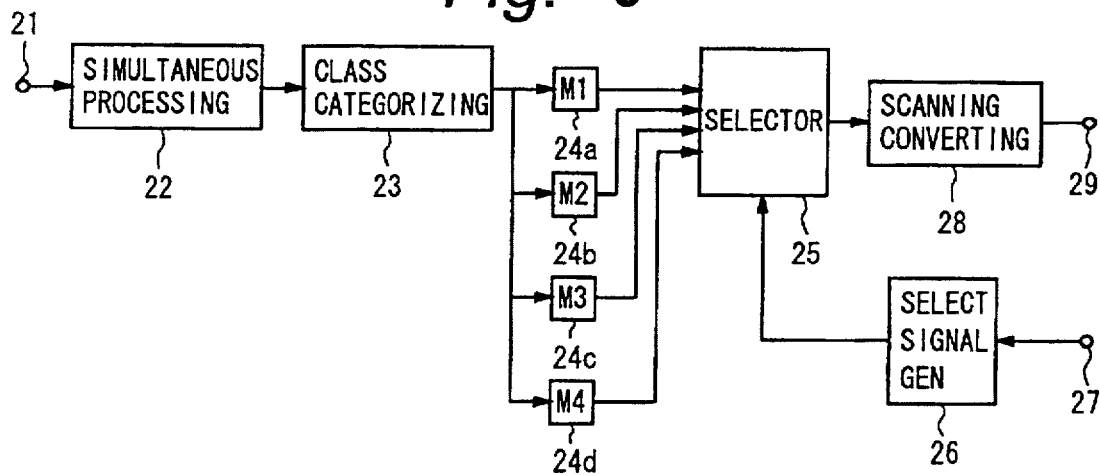
FIG. 6 is a block diagram showing an example of a class categorizing adaptive processing circuit according to an embodiment of the present invention.

FIG. 6 shows an example of the class categorizing adaptive processing circuit 9. A digital video signal that is output from the block desegmenting circuit 8 is supplied to an input terminal 21. The digital video signal is a flat component in the frequency region (transient component in the time region) of the SD video signal that is an impulse component in the time region. The digital video signal is supplied to a simultaneous processing circuit 2. The output data of the simultaneous processing circuit 22 is supplied to a class categorizing circuit 23. The output of the class categorizing circuit 23 is supplied to memories 24a to 24d as an address signal. The memories 24a to 24d store mapping tables M1 to respectively.

Figure 7:
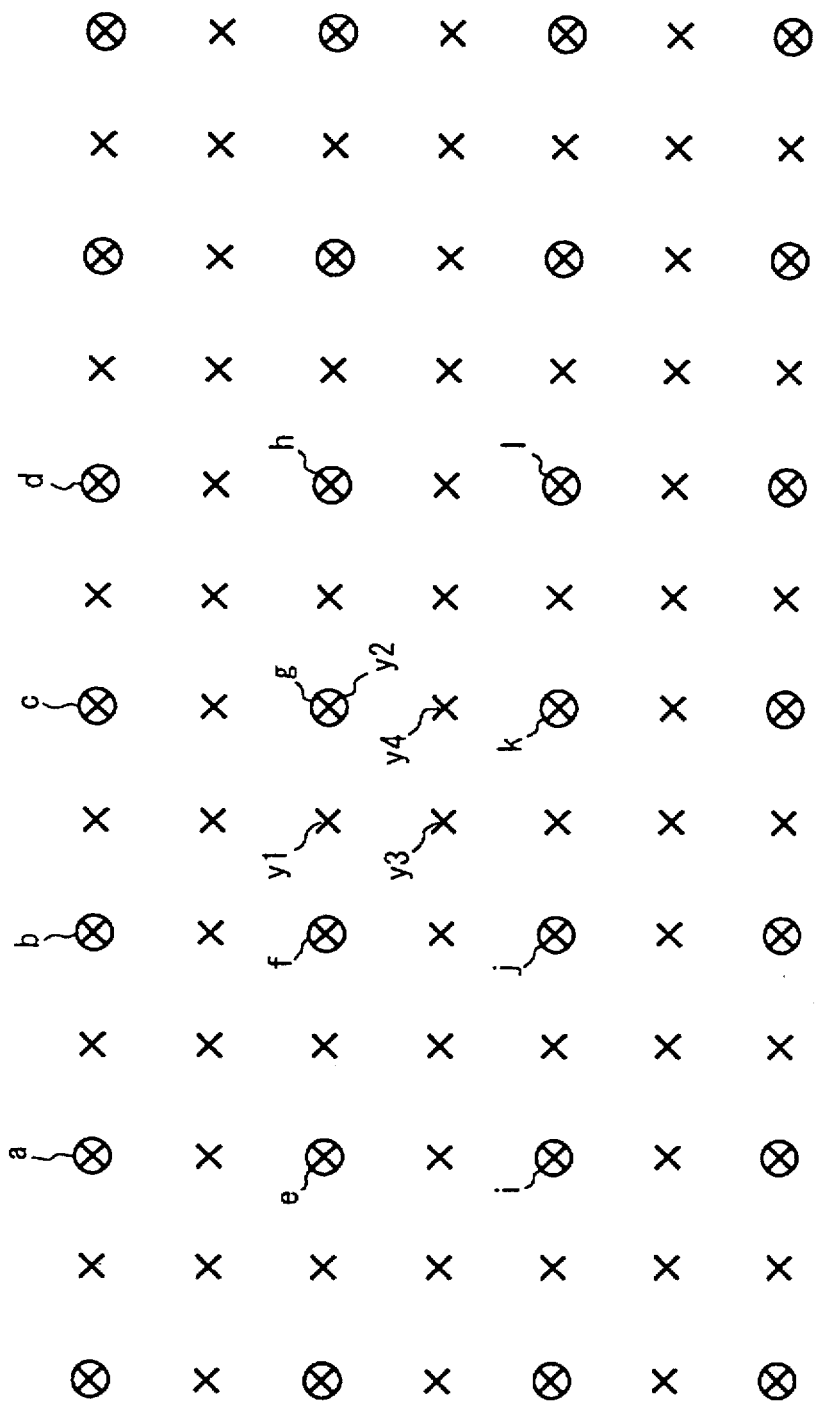
FIG. 7 is a schematic diagram showing an arrangement of pixels between SD pixels and HD pixels.

FIG. 7 shows a partial schematic diagram showing the relation between an SD image and an HD image. In FIG. 7, pixel data denoted by O represent the SD image. Pixel data denoted by X represent the HD image. For example, four HD pixel data y1 to y4 are composed of 12 SD pixel data a to 1 by the class categorizing adaptive processing circuit 9. The mapping table M1 of the memory 24a generates the pixel data y1. The mapping tables M2, M3, and M4 of the memories 24b, 24c, and 24d generate the pixel data y2, y3, and y4, respectively.

The outputs that are read from the memories 24a to 24d are supplied to a selector 25. The selector 25 is controlled by the output of a select signal generating circuit 26. A sample clock of an HD image is supplied to the select signal generating circuit 26 through an input terminal 27. The selector 25 selects the four pixel data y1 to y4 one after the other. These pixel data are supplied to a scanning converting circuit 28. The scanning converting circuit 28 generates and outputs the pixel data of the HD image to an output terminal 29 in the raster scanning sequence. The number of pixels of an output image is four times larger than the number of pixels of an input SD video signal.

Figure 8:
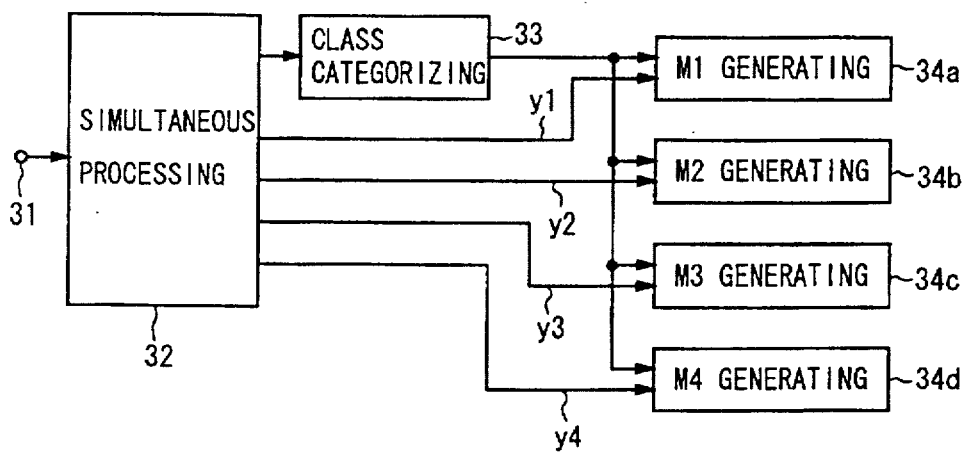
FIG. 8 is a block diagram showing an example of the construction for generating a mapping table that stores predicted coefficients.

The mapping tables M1 to M4 stored in the memories 24a to 24d are pre-learnt. FIG. 8 shows an example of the construction for generating the mapping tables M1 to M4. In FIG. 8, a digital HD video signal is supplied to an input terminal 31. The HD video signal is preferably a standard signal considered for generating the mapping tables. In reality, a standard image is photographed by an HD video camera. By recording the photograph signal to an HDVTR, an HD video signal is obtained.

The HD video signal is supplied to a simultaneous processing circuit 32. The simultaneous processing circuit 32 simultaneously outputs pixel data a to 1 and $y_1$ to $y_4$ that represent the relation of positions shown in FIG. 7. The pixel data a to 1 are supplied to a class categorizing circuit 33. The class categorizing circuit 33 categorizes the HD pixel data $y_1$ to $y_4$ as classes corresponding to tone, pattern, or the like. The output of the class categorizing circuit 33 is supplied to mapping table generating circuits 34a to 34d in common.

The pixel data $y_1$ to $y_4$ that are output from the simultaneous processing circuit 32 are supplied to the mapping table generating circuits 34a to 34d, respectively. The structure of each of the mapping table 34a to 34d is the same. There are two types of mapping tables. One type is used to predict the values $y_1$, $y_2$, $y_3$, and $y_4$ of the HD pixels by linear combination of the values a to 1 of the SD pixels and the coefficients $w_1$ to $w_{12}$. In this case, the coefficients $w_1$ to $w_{12}$ are obtained for each class. The other type is used to obtain the values of the HD pixels predicated for each class.

The memories with which the mapping table generating circuits 34a to 34d shown in FIG. 8 are provided store mapping tables that represent the correlation between the HD video signal and the SD video signal. In other words, when a plurality of data of the SD video signal are provided, a mapping table that outputs the pixel data of the HD video signal that averagely corresponds to the class of the data can be formed.

As with the class categorizing circuit 23 shown in FIG. 6, the class categorizing circuit 33 categorizes considered pixel data as a class and generates class information. The considered pixel can be categorized as a class corresponding to tone, pattern, or the like. When the tone is used and the number of pixel data is composed of eight bits, since the number of classes becomes very large, the number of bits of each pixel is preferably decreased by highly efficient encoding method such as ADRC method. A plurality of patterns each of which is composed of four pixels (for example, flat pattern and patterns that increase in upper right direction and decrease in lower left direction, etc.) are provided. The output data of the simultaneous processing circuit 32 is categorized as one of a plurality of patterns.

For example, the mapping table generating circuit 34a that obtains the HD pixel data $y_1$ has a memory to which class information that is an address is supplied from the class categorizing circuit 33. When the training (learning) operation is performed, the original HD video signal is thinned out so as to form an SD video signal. In this case, horizontal decimation process (for sub samples) and the vertical decimation process (for sub lines) are performed. An HD video signal for one frame or more (for example, a still image) is used. Sample values of pixel data a to 1 and y1 are written to addresses of the memory corresponding to class information. For example, $(a_{10}, a_{20}, \ldots, a_{n0}) (b_{10}, b_{20}, \ldots, b_{n0}) \ldots (1_{10}, 1_{20}, \ldots, 1_{n0}) (y_{10}, y_{20}, \ldots, y_{n0})$ are stored in the address AD0 of the memory.

The learnt data is read from the memory. A coefficient that minimizes the error between the predicted value of the HD pixel (corresponding to y1) obtained by liner combination of the values a to 1 of the SD pixels and coefficients $w_1$ to $w_{12}$ and the true value is obtained by the method of least squares. When learnt data stored at the address of the memory is considered, the following simultaneous equations with respect to learnt data stored at an address of one memory are satisfied.

$$y_{10} = w_1 a_{10} + w_2 b_{10} + w_3 c_{10} + \ldots + w_{12} l_{10}$$

$$y_{20} = w_1 a_{20} + w_2 b_{20} + w_3 c_{20} + \ldots + w_{12} l_{20}$$

$$y_{30} = w_1 a_{30} + w_2 b_{30} + w_3 c_{30} + \ldots + w_{12} l_{30}$$

$$Y_{n0} = w_1 a_{n0} + w_2 b_{n0} + w_3 c_{n0} + \ldots + w_{12} l_{n0}$$

Since $y_{10}$ to $y_{n0}$, $a_{10}$ to $a_{n0}$, $b_{10}$ to $b_{n0}$, $c_{10}$ to $c_{n0}$, ..., $1_{10}$ to $1_{n0}$ are known, coefficients $w_1$ to $w_{12}$ that minimize the squares of errors of predicted values for $y_{10}$ to $y_{n0}$ (true values) can be obtained. The coefficients of other classes (addresses) can be obtained in the same manner. The coefficients obtained in this manner are stored in the memory and used as a mapping table.

Figure 9:
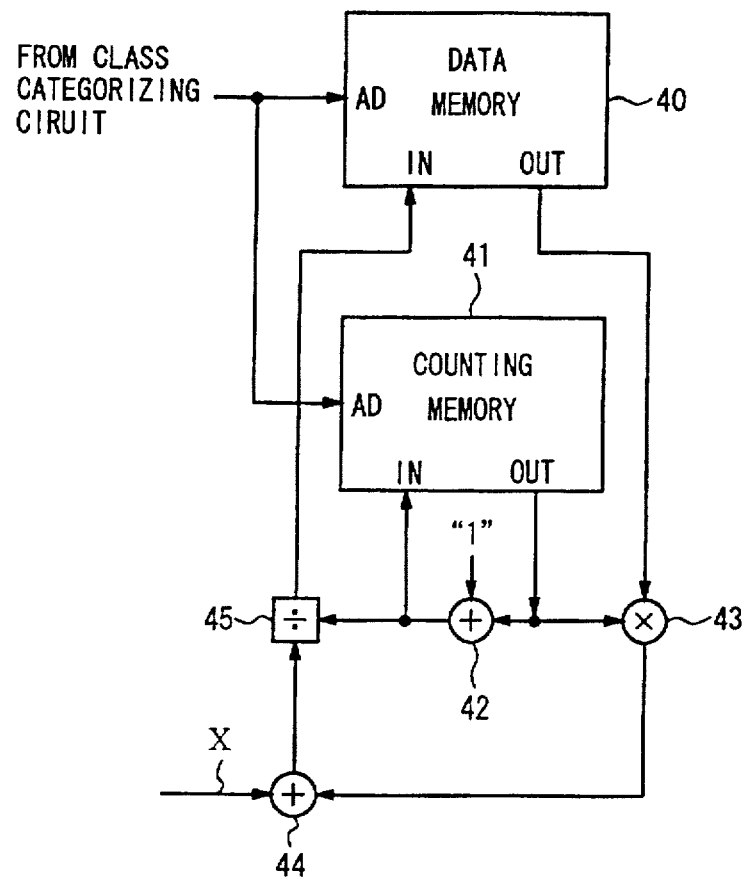
FIG. 9 is a block diagrams showing an example of the construction for generating a mapping table that stores predicted values.

In addition to the coefficients, the values of data of the HD video signal for each class may be obtained by training and then stored in the memory. FIG. 9 shows the construction for performing such an operation. In FIG. 9, a data memory 40 and a counting memory 41 are provided. The class information is supplied as an address to the data memory 40 and the counting memory 41.

The output that is read from the counting memory 41 is supplied to an adding device 42. The adding device 42 increments the value that is output from the counting memory 41 by +1. The output of the adding device 42 is written to the same address of the memory 41. As an initial state, the content of each address of the memories 40 and 41 is cleared to zero.

The data that is read from the data memory 40 is supplied to a multiplying device 43 and multiplied by the count value read from the counting memory 41. The output of the multiplying device 43 is supplied to an adding device 45. The adding device 45 adds the input from the multiplying device 43 and the input data y. The output of the adding device 44 is supplied as a divisor to the dividing device 45. The output (quotient) of the dividing device 45 is input as input data to the data memory 40.

In the construction shown in FIG. 9, when a particular address is accessed at the first time, since the outputs of the memories 40 and 41 are 0, the data $y_{10}$ is directly written to the memory 40. The value of the address corresponding to the memory 41 becomes 1. Thereafter, when the address is accessed again, the output of the adding device 42 is 2 and the output of the adding device 44 is $(y_{10}+y_{20})$. Thus, the output of the dividing device 45 is $(y_{10}+y_{20})/2$. This output is written to the memory 40. When the above-described address is accessed, in the same operation, the data of the memory 40 is changed to $(y_{10}+y_{20}+y_{30})/3$ and the count number is updated to 3.

When the above-described operation is performed for a predetermined period, a class is designated to the memory 40 corresponding to the output of the class categorizing circuit 33. A mapping table that outputs such data is stored in the memory 40. In other words, the mapping table that outputs data averagely corresponds to the class categorized against a plurality of pixel data of the input video signal is formed.

Figure 10:
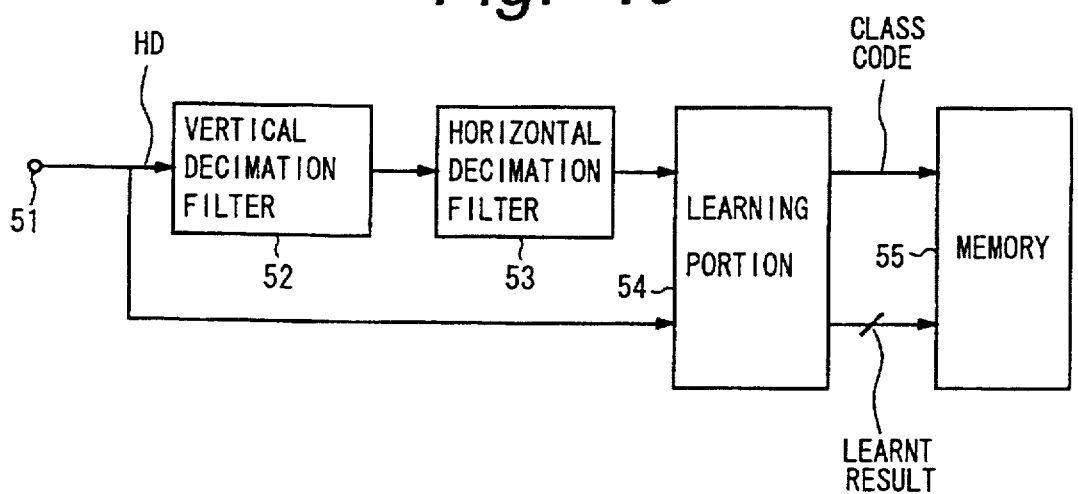
FIG. 10 is a block diagram showing an example of the construction for forming predicted coefficients or predicted values in learning state.

Next, the class categorizing adaptive processing circuit 9 will be described in detail. The class categorizing adaptive processing circuit 9 predetermines the coefficients of the linear combination by training operation. When the training operation is performed, the construction shown in FIG. 10 is used. In FIG. 10, reference numeral 51 is an input terminal. A plurality of still images of standard HD signals are input to the input terminal 51. A vertical decimation filter 52 thins out each input HD image by ½. The vertical decimation filter 52 is connected to a horizontal decimation filter 53. The horizontal decimation filter 53 thins out each input HD image by ½. Still images with the same number of pixels as the SD signal are supplied to a learning portion 54. A memory 55 stores the class code generated by the learning portion 54 and the learnt result.

Figure 11:
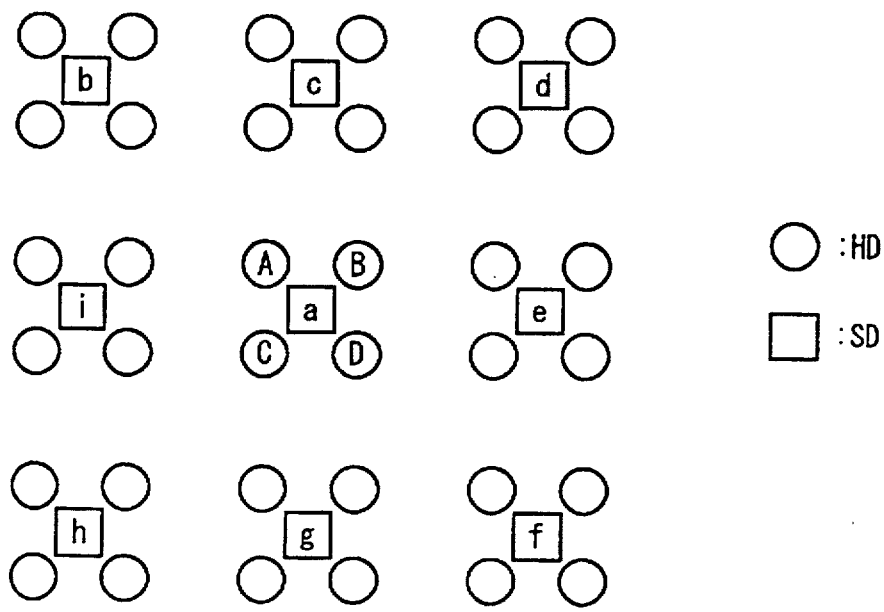
FIG. 11 is a schematic diagram showing another example of an arrangement of pixels between SD another example of an arrangement of pixels between SD pixels and HD pixels.

In this example, as shown in FIG. 11, the relation of positions of HD pixels and SD pixels is defined. As shown in FIG. 11, when an SD pixel (3×3) block is used, one set of SD pixels a to i and HD pixels A, B, C, and D becomes learnt data. When there are a plurality of sets of learnt data for each frame and the number of frames is increased, a large number of sets of learnt data can be used.

Figure 12:
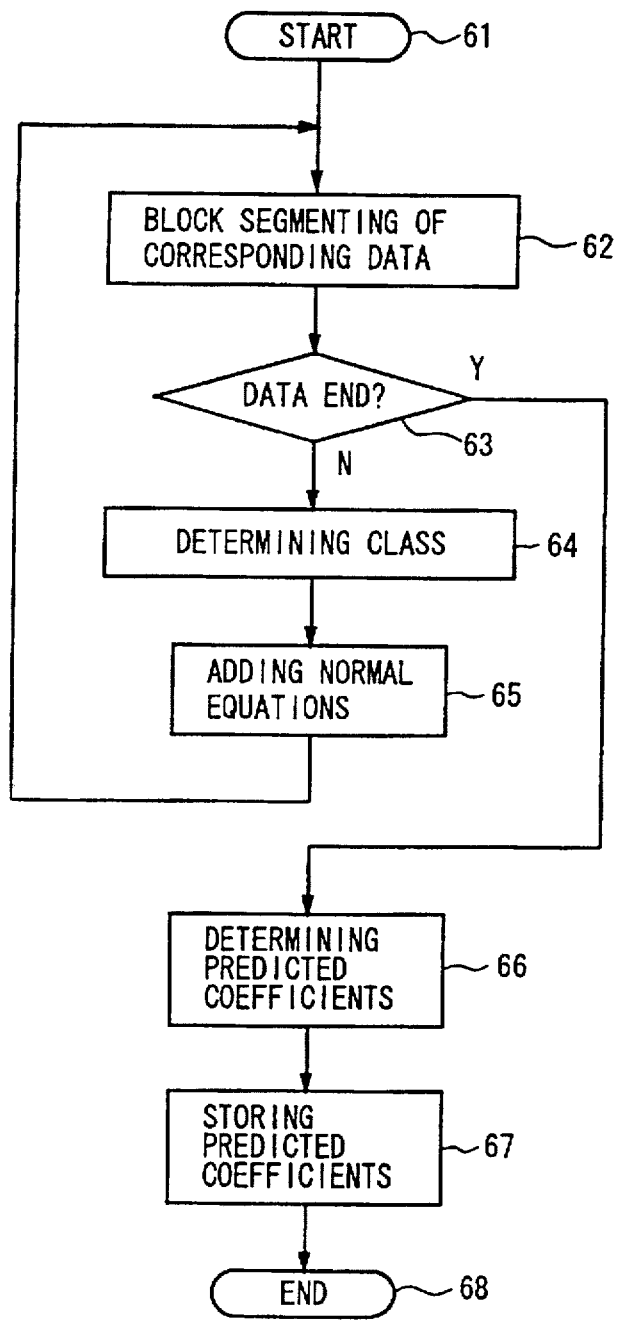
FIG. 12 is a flow chart showing a process for forming predicted coefficients in learning state.

FIG. 12 is a flow chart showing the operation of software for the learning portion 54 that determines coefficients of linear combination. At step 61, the control of the learning portion is started. At step 62 "data block segmentation", an HD signal and an SD signal are supplied and a process for extracting HD pixels and SD pixels that have the relation shown in FIG. 11 is performed. At step 63 "data end", when the process for all data (for example, one frame) has been finished, the flow advances to step 66 "determining predicted coefficients". When the process for one frame has not been finished, the flow advances to step 64 "determining class".

At step 64 "determining class", a class is determined corresponding to the signal pattern of the SD signal. In this control, ADRC can be used so as to reduce the number of bits. At step 65 "adding normal equations", equations that will be described later are generated.

After all data have been processed at step 63 "data end", the flow advances to step 66. At step 66 "determining predicted coefficients", equations that will be described later are solved corresponding to matrix solution so as to determine predicted coefficients. At step 67 "storing predicted coefficients", the predicted coefficients are stored in the memory. At step 68, the control of the learning portion is finished. In the memory, the predicted coefficients of the class that is determined as an address corresponding to the SD signal are stored. The class and the predicted coefficients correspond to the above-described mapping table.

Next, the process for obtaining coefficients that define the relation between HD pixels and SD pixels shown in FIG. 11 will be described in detail. Now, it is assumed that the SD pixel levels are denoted by $x_1$ to $x_n$ and the HD pixel level is denoted by y. In this case, a linear estimating equation with n taps of coefficients $w_1$ to $w_n$ for each class is represented as follows.

$$y' = w_1 x_1 + w_2 x_2 + \ldots + w_n x_n \quad (1)$$

Before the learning operation is performed, $w_i$ is an unknown coefficient.

As described above, a plurality of HD data and SD data are learnt for each class. When the number of data is m, the following expression is obtained corresponding to the equation 1.

$$y_j' = w_1 x_{j1} + w_2 x_{j2} + \ldots + w_n x_{jn} \quad (2)$$

(where j=1, 2, ..., m)

When m>n, since $w_1$ to $w_n$ are not uniquely determined, elements of the error vector e are defined as follows and coefficients that minimize the value of the equation 4 are obtained.

$$e_j = y_j - (w_1 x_{j1} + w_2 x_{j2} + \ldots + w_n x_{nj}) \quad (2)$$

(where j=1, 2, ..., m)

$$E^2 = \sum_{j=0}^{m} \{e_j\}^2 \quad (4)$$

In other words, the coefficients are obtained by so-called method of least squares. Next, partial differential coefficients are obtained with respect to $w_i$ of the equation 3.

$$\frac{\partial E^2}{\partial w_i} = \sum_{j=0}^{m} 2 \left( \frac{\partial e_j}{\partial w_i} \right) e_j = \sum_{j=0}^{m} 2 x_{ji} \cdot e_j \quad (5)$$

Since each $w_i$ is obtained so that the value of the equation 6 becomes 0.

$$X_{ji} = \sum_{p=0}^{m} x_{pi} \cdot x_{pj} \quad (6)$$

$$Y_i = \sum_{j=0}^{m} x_{ji} \cdot y_j \quad (7)$$

The equations 6 and 7 can be represented by the following matrix.

$$\begin{pmatrix} X_{11} & X_{12} & \ldots & X_{1n} \\ X_{21} & X_{22} & \ldots & X_{2n} \\ \ldots & \ldots & \ldots & \ldots \\ X_{n1} & X_{n2} & \ldots & X_{nn} \end{pmatrix} \begin{pmatrix} w_1 \\ w_2 \\ \ldots \\ w_n \end{pmatrix} = \begin{pmatrix} Y_1 \\ Y_2 \\ \ldots \\ Y_n \end{pmatrix} \quad (8)$$

When the equation 8 is solved by a general matrix solution such as sweeping-out method, the predicted coefficients $w_i$ are obtained. With an address of class code, the predicted coefficients $w_i$ are stored in the memory.

Thus, with an HD signal that is true data, the learning portion can obtain the predicted coefficients $w_i$. The predicted coefficients $w_i$ are stored in the memory. With any input SD signal, class information is formed. Predicted coefficients corresponding to class information are read from the memory. By linear combination of the values of SD pixels in the vicinity of the considered pixel and the predicted coefficients, the value of the considered pixel can be formed. Thus, an output HD image corresponding to any input SD image can be generated.

Figure 13:
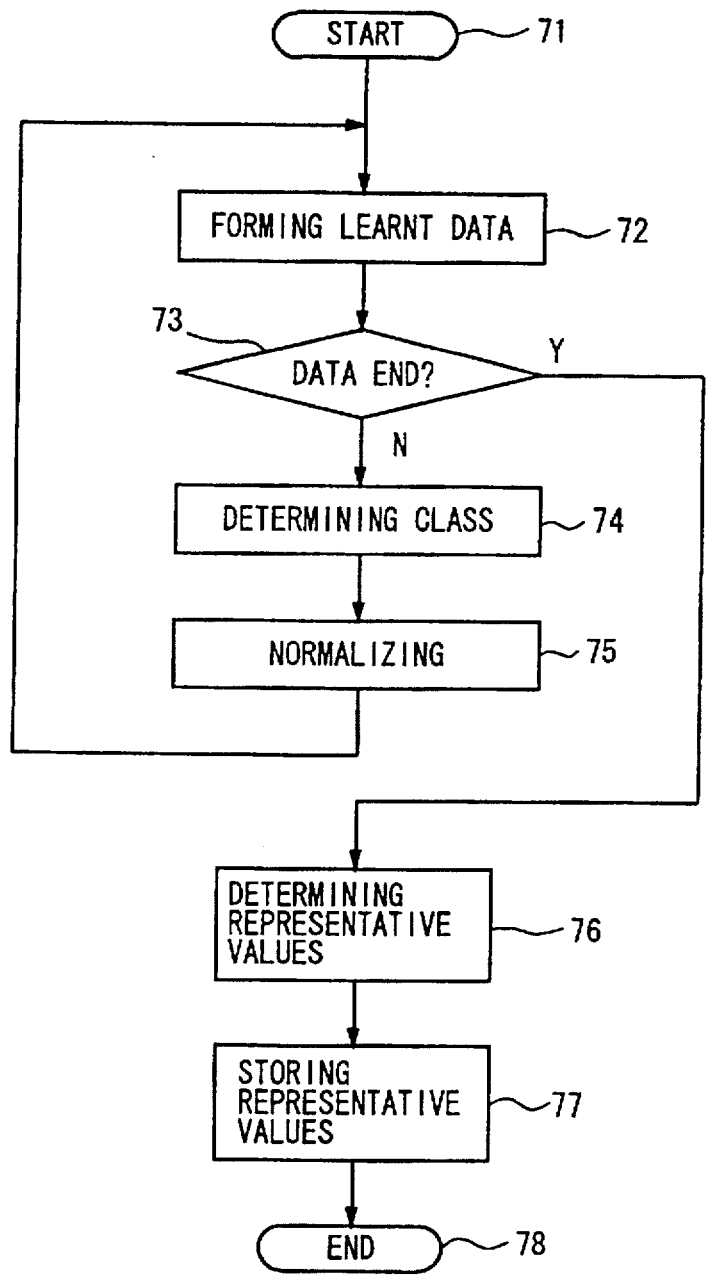
FIG. 13 is a flow chart showing a process for forming predicted values in learning state.

When the learning portion 54 determines a representative value for each class rather than a predicted coefficient, a process corresponding to a flow chart shown in FIG. 13 is performed. Step 71 "start", step 72 "forming learnt data", step 73 "data end", and step 74 "determining class" in FIG. 10 are similar to those at steps 61, 62, 63, and 64 in FIG. 12.

At step 75 "normalizing", the values of pixels are normalized. In other words, when a value (an input value) of an HD pixel is y, the input data is normalized corresponding to (y−base)/DR. In the pixel arrangement shown in FIG. t1, when one block is composed of pixels a to i, DR represents the difference (dynamic range DR) between the maximum value and minimum value of pixels in the block. Base is a reference value of the block. For example, base is the minimum value of pixels of a block. Base may be the average value of pixels of a block other than the minimum value. By the normalization, the relative levels of pixels can be considered.

At step 76 "determining representative value", as with the case shown in FIG. 9, the cumulative number of the class, n(c), is obtained. In addition, the representative value g(c) is obtained. In other words, the representative value g(c)' newly formed is represented as follows.

$$g(c)'=\{(y-\text{base})/DR+n(c)\times g(c)\}/n(c+1) \qquad (9)$$

The representative value for each class obtained in such a manner is stored in the memory.

Instead of the ADRC circuit, any information compressing means for class categorization such as DCT (Discrete Cosine Transform), VQ (Vector Quantifying), or DPCM (prediction encoding) circuit can be provided.

The class categorizing adaptive processing circuit 9 learns the relation between an SD signal and an HD signal in a time region corresponding to the characteristics of the true image. Thus, the HD signal corresponding to the SD signal is generated. Since the class is adaptively selected corresponding to the level distribution of the SD signal. Thus, the up-conversion corresponding to local characteristics of the image can be performed. Unlike with the interpolating filter, an HD signal with a compensated resolution can be obtained.

Figure 14:
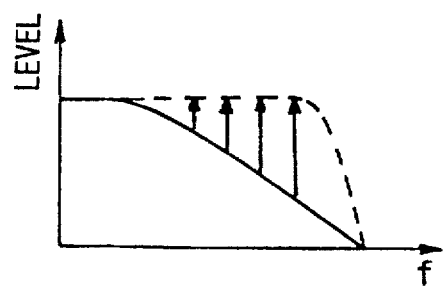
FIG. 14 is a schematic diagram for explaining a high band compensation in a frequency region.

Returning to FIG. 5, an impulse component 6b in the frequency region is supplied from the categorizing circuit 5. The gain converting circuit 10 as a first processing circuit compensates the resolution in the frequency region. In other words, the gain conversion compensates the decrease of the high band gain due to the signal process as shown in FIG. 14. As with the class categorizing adaptive processing circuit 9, the gain converting circuit 10 has a memory that stores a mapping table that compensates a high band. As with the above-described class categorizing adaptive processing circuit 9 in the time region, there are two types of mapping tables, one of which outputs gain converting ratio and the other of which outputs a predicted value of the gain.

Figure 15:
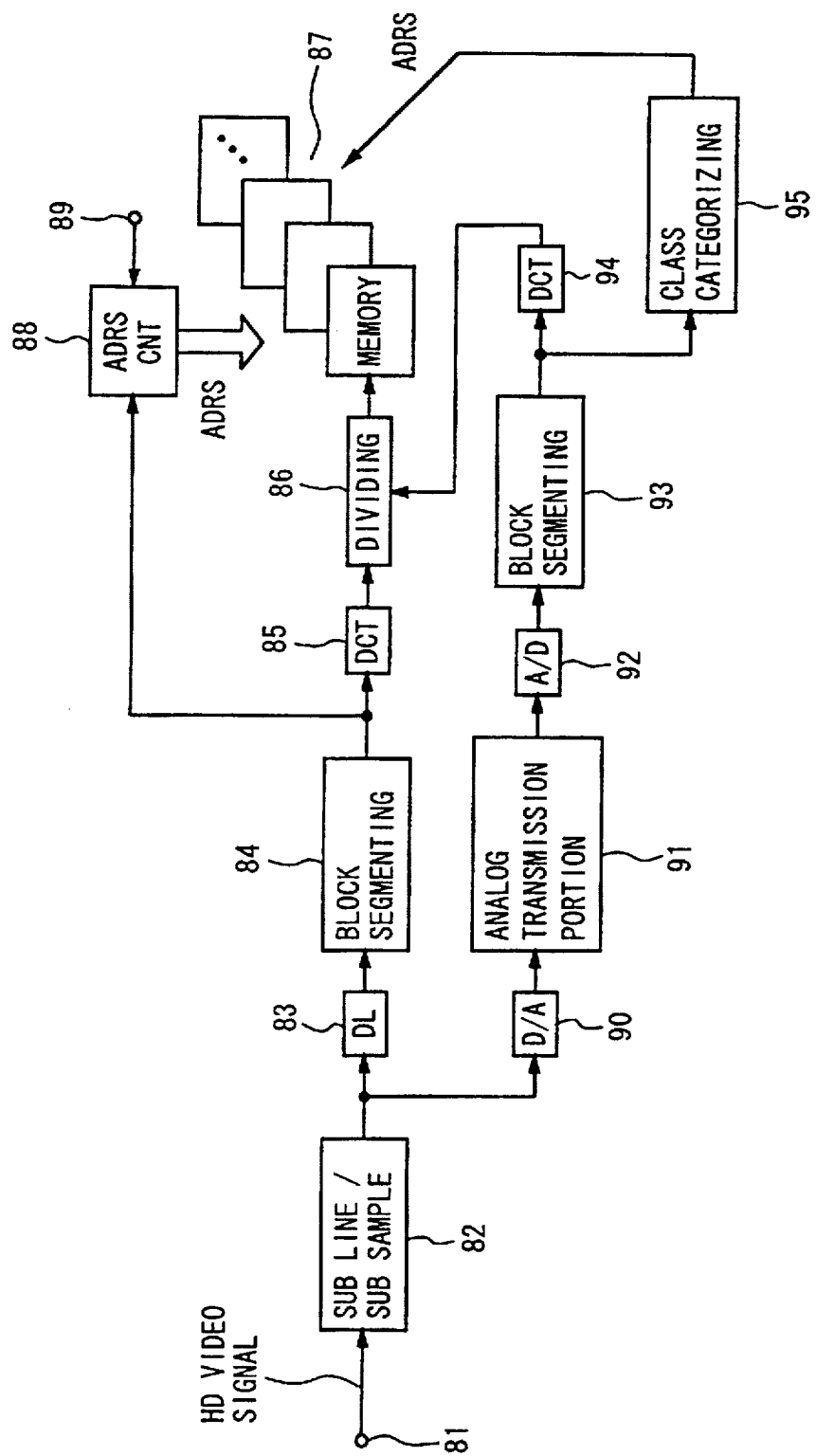
FIG. 15 is a block diagram for learning a gain converting ratio for high band compensation in a frequency region.

FIG. 15 shows the construction of forming a mapping table of the gain converting portion 10 in the learning state. HD video data to be learnt is supplied to an input terminal 81. Thereafter, the HD video data is supplied to a sub line/sub sample circuit 82. The circuit 82 performs vertical decimation operation for sub lines and horizontal decimation operation for sub samples. Thus, the sub line/sub sample circuit 82 generates a video signal with the similar resolution to that of the SD video signal.

The sub line/sub sample circuit 82 is connected to a delay circuit 83 and a D/A converter 90. The delay circuit 83 delays the input data until the input data is categorized as a class so as to match the timing of the operation. The delay circuit 83 is connected to a block segmenting circuit 84. For example, data of a block structure composed of (4×4) are formed. The output of the block segmenting circuit 84 is supplied to a DCT circuit 85. The DCT circuit 85 performs cosine transformation for the input signal. The DCT circuit 85 generates coefficient data in zigzag sequence from DC component to lower order AC components to higher order AC components.

The coefficient data that is output from the DCT circuit 85 is supplied to a dividing circuit 86. The dividing circuit 86 obtains a gain converting ratio for coefficient data necessary for compensating the high band. The dividing circuit 86 outputs a gain converting ratio signal to a memory 87. The memory 87 has a plurality of memory portions that store the gain converting ratios corresponding to a plurality of DCT coefficients.

To determine the deterioration of the high band of the SD video signal due to the signal process, the SD video signal that has been converted into an analog signal by a D/A converter 90 is supplied to an analog transmission portion 91. The analog transmission portion 91 performs for example recording and reproducing processes for an analog VTR. The video signal that is output from the analog transmission portion 91 is supplied to an A/D converter 92. The A/D converter 92 converts the analog signal into a digital signal. The digital signal is supplied to a block segmenting circuit 93.

The block segmenting circuit 93 forms digital video data with the same block structure as the output data of the block segmenting circuit 84. The output data of the block segmenting circuit 93 is supplied to a DCT circuit 94 and a class categorizing circuit 95. The coefficient data that is output from the DCT circuit 94 is supplied to a dividing circuit 86. For coefficient data with the same order, the dividing process is performed. A gain converting ratio signal with respect to coefficient data is generated by the dividing circuit 86. In other words, when a signal passes through the analog transmission portion 91, the high band frequency component is lost. The gain converting ratio signal represents how the gain (value) of each component of the DCT coefficient data varies.

Now, it is assumed that the DCT circuit 85 generates coefficient data DC and AC1 to AC15 and that the DCT circuit 94 generates coefficient data DC' and AC1' to AC5'. The dividing circuit 86 forms gain converting ratio signals $G_0, G_1, \ldots, G_{15}$ by the following arithmetic operations.

$$G_0=DC/DC', G_1=AC/AC', \ldots, G_{15}=AC_{15}/AC_{15}'$$

In FIG. 15, by averaging a plurality of gain converting ratio signals for each coefficient (they are omitted for simplicity), the final gain converting ratio signal is obtained and stored in the memory 87.

When the gain converting ratio signal is multiplied by coefficient data of video data whose high band has been attenuated, coefficient data of the video data whose high band has been compensated can be generated. The gain converting circuit 10 shown in FIG. 5 has a memory that stores a gain converting ratio signal that has been learnt. By multiplying the coefficient data by the gain converting ratio signal, the value of the coefficient data is changed. Thus, the high band can be compensated.

The class categorizing circuit 95 categorizes the block data supplied from the block segmenting circuit 93 as a class corresponding to the level distribution thereof. For the class categorization, as described above, data compression such as ADRC is preferably performed. The class information obtained by the class categorizing circuit 95 is supplied to the memory 87 as an address in the memory. The memory 87 has a plurality of memory portions corresponding to coefficient data of DC component and AC components of all orders. The memory portions store gain conversion ratio signals corresponding to coefficient data.

An address for switching the memory portions corresponding to coefficient data is formed by an address counter 88. The address counter 88 counts the clock signal received from an input terminal 89 and generates addresses that vary one after the other. In this case, the addresses vary in synchronization with the coefficient data received from the block segmenting circuit 84. A plurality of types of HD video signals are supplied to the input terminal 81. An optimum gain converting ratio signal for each class is formed and stored in the memory 87.

Instead of the gain converting ratio, predicted values of DCT coefficients can be learnt.

The same gain converting ratio signal as that stored in the memory 87 is stored in the memory of the gain converting circuit 10 shown in FIG. 5. The output signal of the block segmenting circuit 2 is supplied to the gain converting circuit 10 that categorizes the signal as a class. The gain converting circuit 10 multiplies each component of the DCT coefficient data by the gain converting ratio signal so as to adjust the gain. Thus, the high band of the frequency region is compensated. The impulse component 6b in the frequency region is supplied to the gain converting circuit 10. When a signal composed of various components including a flat component is converted, a non-linear component is mixed and thereby the accuracy is deteriorated. Thus, the gain cannot be correctly converted. With the same reason, when the learning operation shown in FIG. 15 is performed, an impulse signal is used.

In the above-described embodiment, the present invention is applied for the compensation of resolution of a video signal, more particularly, for up-conversion from an SD signal to an HD signal. However, the present invention can be also applied for other than the signal process. For example, the present invention can be applied for a noise removing circuit.

As noises, impulse noise (white noise) and pink noise are generally known. The impulse noise can be removed by a median filter in a time region. In the median filter, values of three successive sample data on the time axis are compared. When the value of the middle sample data is not present between the values of the earlier and later sample data, the middle sample data is treated as a noise. The value of the middle sample data is substituted with a nearer value of the earlier and later sample data (for example, refer to Japanese Utility Model Registration Examined Publication No. HEI 3-19094).

An impulse noise in the time region can be removed by the median filter. However, a flat noise (pink noise) cannot be easily removed in the time region. According to the present invention, in addition to the noise removing process in the time region using the median filter, for example, a digital low-pass filter is used to remove the noise. Thus, the noise component that is flat in the time region can be removed. Consequently, various noises in the input digital signal can be removed.

In addition to the compensation of resolution and the noise removing circuit, the present invention can be applied for other digital signal processes.

As described above, according to the present invention, a digital information signal is separated into a steady component and a transient component. These components are individually processed in a time region and a frequency region so that they can be properly represented. After these processes, the components are mixed. Thus, the process time can be reduced, the hardware scale can be reduced, and the accuracy of the signal process can be improved in comparison with the case that the processes in the time region and the frequency region are performed in two stages.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An apparatus for converting a first digital image signal having a first resolution into a second digital image signal having a second resolution, said second resolution being a higher resolution than said first resolution, said apparatus comprising:

means for analyzing the first digital image signal to categorize the first digital image signal into a third signal having a component processed in a temporal region and a fourth signal having a component processed in a frequency region;

means for categorizing the first digital image signal into the third signal and the fourth signal in response to an output of said analyzing means;

first processing means for adaptively processing the third signal categorized by said categorizing means in the temporal region to form the second digital image signal having the second resolution;

second processing means for adaptively processing the fourth signal categorized by said categorizing means in the frequency region to form the second digital image signal having the second resolution; and means for combining an output signal from said first processing means and an output signal from said second processing means to generate the second digital image signal having the second resolution.

2. The apparatus as set forth in claim 1, wherein said means for analyzing includes means for performing orthogonal transformation.

3. The apparatus as set forth in claim 2, wherein the orthogonal transformation means performs either fast fourier transformation or discrete cosine transformation.

4. The apparatus as set forth in claim 1, wherein said first processing means comprises:

class categorizing means for receiving the third signal and determining a class corresponding to the third signal;

compensation value generating means for generating a compensation value of the third signal so as to obtain the second resolution that is higher than the first resolution for each determined class; and compensating means for compensating the third signal corresponding to the generated compensation value.

5. The image converting apparatus as set forth in claim 4, wherein said compensation value generating means has a memory for storing the compensation value for each class, and wherein the compensation value for each class is pre-learnt by a digital image signal with the second resolution and a digital image signal with the first resolution that is lower than the second resolution, the digital image signal with the first resolution being obtained by processing the digital image signal with the second resolution.

6. The apparatus as set forth in claim 5, wherein the digital image signal with the second resolution is processed by an analog processing portion so as to attenuate the high band component of the digital image signal, obtain the ratio of a component of which the second digital image signal has been converted into the frequency region and a component of which the digital image signal with the high band component attenuated has been converted into the frequency region, and obtain the compensation value for each class corresponding to the ratio when the compensation value for each class is learnt.

7. The apparatus as set forth in claim 1, wherein said first processing means comprises:

class categorizing means for receiving the third signal and determining a class corresponding to the third signal; and compensation value generating means for generating a value representing the third signal with the second resolution that is higher than the first resolution for each determined class.

8. The apparatus as set forth in claim 7, wherein said compensation value generating means has a memory for storing a value representing the third signal with the second resolution for each class, and wherein the value representing the third signal with the second resolution for each class is pre-learnt with the digital image signal with the second resolution and the digital image signal with the first resolution that is lower than the second resolution, the digital image signal with the first resolution being obtained by processing the digital image signal with the second resolution.

9. The apparatus as set forth in claim 8, wherein the digital image signal with the second resolution is processed by an analog processing portion so as to attenuate the high band component of the digital image signal, obtain the ratio of a component of which the second digital image signal has been converted into the frequency region and a component of which the digital image signal with the high band component attenuated has been converted into the frequency region, and obtain the compensation value for each class corresponding to the ratio when the compensation value for each class is learnt.

10. The apparatus as set forth in claim 1, wherein said component processed in the temporal region is a transient component in the temporal region and said component processed in the frequency region is a transient component in the frequency region.

11. The apparatus as set forth in claim 10, wherein said transient component is an impulse component.

12. A method for converting a first digital image signal having a first resolution into a second digital image signal having a second resolution, said second resolution being a higher resolution than said first resolution, comprising the steps of:

analyzing the first digital image signal to categorize the first digital image signal into a third signal having a component processed in a temporal region and a fourth signal having a component processed in a frequency region and producing an analyzed output representative thereof;

categorizing the first digital image signal into the third signal and the fourth signal in response to said analyzed output;

adaptively processing the third signal in the temporal region to form the second digital image signal having the second resolution;

adaptively processing the fourth signal in the frequency region to form the second digital image signal having the second resolution; and combining the adaptively processed third and fourth signals to generate the second digital image signal having the second resolution.

13. The method as set forth in claim 12, wherein said component processed in the temporal region is a transient component in the temporal region and said component processed in the frequency region is a transient component in the frequency region.

14. The method as set forth in 13, wherein said transient component is an impulse component.

15. The method of claim 12, wherein said step of analyzing includes performing an orthogonal transformation.

16. The method of claim 15, wherein the orthogonal transformation is either a fast Fourier transformation or a discrete cosine transformation.

17. The method of claim 12, wherein the third signal is adaptively processed by receiving the third signal and determining a class corresponding to the third signal; generating a compensation value of the third signal so as to obtain the second resolution that is higher than the first resolution for each determined class; and compensating the third signal corresponding to the generated compensation value.

18. The method of claim 17, wherein the generated compensation value is stored for each class, and wherein the compensation value for each class is pre-learned by a digital image signal with the second resolution and a digital image signal with the first resolution that is lower than the second resolution, the digital image signal with the first resolution being obtained by processing the digital image signal with the second resolution.

19. The method of claim 18, wherein the digital image signal with the second resolution is processed by an analog processing portion so as to attenuate the high band component of the digital image signal, obtain the ratio of a component of which the second digital image signal has been converted into the frequency region and a component of which the digital image signal with the attenuated high band component has been converted into the frequency region, and obtain the compensation value for each class corresponding to the ratio when the compensation value for each class is learned.

20. The method of claim 12, wherein the third signal is adaptively processed by receiving the third signal and determining a class corresponding to the third signal; and generating a value representing the third signal with the second resolution that is higher than the first resolution for each determined class.

21. The method of claim 20, wherein a value representing the third signal with the second resolution for each class is stored; and wherein the value representing the third signal with the second resolution for each class is pre-learned with the digital image signal with the second resolution and the digital image signal with the first resolution that is lower than the second resolution, the digital image signal with the first resolution being obtained by processing the digital image signal with the second resolution.

22. The method of claim 21, wherein the digital image signal with the second resolution is processed by an analog processing portion so as to attenuate the high band component of the digital image signal, obtain the ratio of a component of which the second digital image signal has been converted into the frequency region and a component of which the digital image signal with the attenuated high band component has been converted into the frequency region, and obtain the compensation value for each class corresponding to the ratio when the compensation value for each class is learned.

23. An apparatus for processing a digital signal, comprising:

means for analyzing an input digital signal to categorize the input digital signal into a first signal having a component processed in a temporal region and a second signal having a component processed in a frequency region, wherein said component processed in the temporal region is a transient component in the temporal region and said component processed in the frequency region is a transient component in the frequency region;

means for categorizing the input signal into the first signal and the second signal in response to an output of said analyzing means;

first processing means for adaptively processing the first signal categorized by said categorizing means in the temporal region;

second processing means for adaptively processing the second signal categorized by said categorizing means in the frequency region; and means for combining an output signal from said first processing means and an output signal from said second processing means.

24. The apparatus as set forth in claim 23, wherein said transient component is an impulse component.

25. A method of processing a digital signal, comprising the steps of:

analyzing an input digital signal to categorize the input digital signal into a first signal having a component processed in a temporal region and a second signal having a component processed in a frequency region and producing an analyzed output representative thereof, wherein said component processed in the temporal region is a transient component in the temporal region and said component processed in the frequency region is a transient component in the frequency region;

categorizing the input digital signal into the first signal and the second signal in response to said analyzed output;

adaptively processing the first signal in the temporal region; adaptively processing the second signal in the frequency region; and combining the adaptively processed first and second signals.

26. The method as set forth in claim 25, wherein said transient component is an impulse component.

* * * * *